US012752299B2

(12) United States Patent
Usami et al.

(10) Patent No.: US 12,752,299 B2
(45) Date of Patent: Oct. 6, 2026

(54) FORMING METHOD OF LINEAR PATTERN INCLUDING SOLID PARTICLES AND TRANSFER PLATE

(71) Applicant: CANON KABUSHIKI KAISHA, Tokyo (JP)

(72) Inventors: Hirokazu Usami, Kanagawa (JP); Kenta Kubo, Kanagawa (JP); Hiroshi Taniuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/221,371

(22) Filed: May 28, 2025

(65) Prior Publication Data

US 2025/0289025 A1 Sep. 18, 2025

Related U.S. Application Data

(63) Continuation of application No. PCT/JP2023/042204, filed on Nov. 24, 2023.

(30) Foreign Application Priority Data

Nov. 30, 2022 (JP) ................................ 2022-190924

(51) Int. Cl.

*B05C 19/06* (2006.01)
*B05D 1/28* (2006.01)
*H01M 10/058* (2010.01)

(52) U.S. Cl.

CPC ................ *B05C 19/06* (2013.01); *B05D 1/28* (2013.01); *H01M 10/058* (2013.01)

(58) Field of Classification Search

CPC . B05C 1/02; B05C 19/06; B05D 1/28; H01M 4/139; H01M 10/058;

(Continued)

(56) References Cited

U.S. PATENT DOCUMENTS 6,110,316 A * 8/2000 Kobayashi ............... B41M 3/12 156/247
2011/0244116 A1* 10/2011 Badre .................... B82Y 30/00 977/773

(Continued)

FOREIGN PATENT DOCUMENTS

JP H1043671 A 2/1998
JP 2000153220 A 6/2000

(Continued)

OTHER PUBLICATIONS

Wilbur et al. Microfabrication by Microcontact Printing of Self-Assembled Monolayers. Adv. Mater. 1994, 6, 600-604. (Year: 1994).*

*Primary Examiner* — William P Fletcher, III
(74) *Attorney, Agent, or Firm* — Canon.U.S.A., Inc. IP Division

(57) ABSTRACT

A forming method of a linear pattern, includes bringing a transfer plate including a raised portion extending in a predetermined direction and a material to be transferred containing solid particles into contact with each other and causing the raised portion to hold the solid particles, pressing the raised portion against a base material, and separating the raised portion from the base material, wherein the raised portion has distribution of holding power to hold the material to be transferred in a width direction orthogonal to the predetermined direction in a manner that a region with higher holding power is interposed between regions with lower holding power, and has a portion with an elastic modulus that is lower than an elastic modulus of the solid particles.

15 Claims, 13 Drawing Sheets

S1000

(58) Field of Classification Search
CPC ...... B29C 64/141; B41F 1/18; B41P 2200/00; B41C 2210/00
USPC ........ 427/180, 256, 261, 262, 267, 280, 286
See application file for complete search history.

(56) References Cited

U.S. PATENT DOCUMENTS

| | | | | |
|---|---|---|---|---|
| 2020/0368818 | A1* | 11/2020 | Kubo | B22F 3/1021 |
| 2021/0114364 | A1* | 4/2021 | Suzuki | B32B 18/00 |

FOREIGN PATENT DOCUMENTS

| | | | | | |
|---|---|---|---|---|---|
| JP | 2005308954 | A | | 11/2005 | |
| JP | 2019137060 | A | | 8/2019 | |
| JP | WO2019235385 | A1 | | 12/2019 | |
| JP | 2021010862 | A | * | 2/2021 | |
| WO | WO-2019235385 | A1 | * | 12/2019 | C23C 24/02 |

* cited by examiner

S101

S102

S103

FORMING METHOD OF LINEAR PATTERN INCLUDING SOLID PARTICLES AND TRANSFER PLATE

CROSS-REFERENCE TO RELATED APPLICATIONS

This application is a Continuation of International Patent Application No. PCT/JP2023/042204, filed Nov. 24, 2023, which claims the benefit of Japanese Patent Application No. 2022-190924, filed Nov. 30, 2022, both of which are hereby incorporated by reference herein in their entirety.

BACKGROUND OF THE INVENTION

Field of the Invention

The present invention relates to a forming method of a linear pattern including solid particles, and a transfer plate.

Background Art

Attention has been directed to an additive manufacturing method of building a three-dimensional object in a desired shape with material layers formed of a material of various kinds, such as a metal, ceramics, and a resin. In recent years, the field of application of the additive manufacturing method has been broadened, and known is a method of forming not only mock-ups or parts made of a single kind material but also forming patterns made of a plurality of kinds of materials to form various kinds of devices, such as an electronic component and a wiring substrate. In such an additive manufacturing method, disposing a material with high density is required to enhance the quality of a formed object.

Japanese Patent Application Laid-Open No. 2019-137060 discusses a method of disposing a plurality of kinds of solid particles having different compositions and different particle diameters on a substrate to form an electrode that is applicable to a secondary battery. Japanese Patent Application Laid-Open No. 2019-137060 further discusses a method of using a transfer plate having a recessed portion, in which first particles are filled by rubbing of a bearing material that carries the first particles against the transfer plate, to bring a base material having adherence into contact with the transfer plate and thereby transfer the first particles from the transfer plate.

Japanese Patent Application Laid-Open No. 2005-308954 discusses a technique of pressing an uneven pattern including a protrusion with a linear shape or a broken line shape at an end of an upper surface of a raised portion against an ink layer to transfer and remove an unnecessary portion, and thereby forming an ink pattern.

SUMMARY OF THE INVENTION

In consideration of the above-mentioned issue, the present invention is directed to providing of a technique of transferring a fine linear pattern including solid particles.

According to an aspect of the present invention, a forming method of a linear pattern, includes bringing a transfer plate including a raised portion extending in a predetermined direction and a material to be transferred containing solid particles into contact with each other and causing the raised portion to hold the solid particles, pressing the raised portion against a base material, and separating the raised portion from the base material, wherein the raised portion has distribution of holding power to hold the material to be transferred in a width direction orthogonal to the predetermined direction in a manner that a region with higher holding power is interposed between regions with lower holding power, and has a portion with an elastic modulus that is lower than an elastic modulus of the solid particles.

Further features of the present invention will become apparent from the following description of exemplary embodiments with reference to the attached drawings.

DESCRIPTION OF THE EMBODIMENTS

The exemplary embodiments for implementing this invention will be described in detail below with reference to the drawings. The dimensions, materials, shapes, and relative positions of components described in the following exemplary embodiments are not intended to limit the scope of this invention to those specifics unless otherwise explicitly stated.

First Exemplary Embodiment

A transfer plate for forming a particle pattern and a method of forming the particle pattern according to a first exemplary embodiment of the present invention will be described with reference to drawings.

Figure 1:
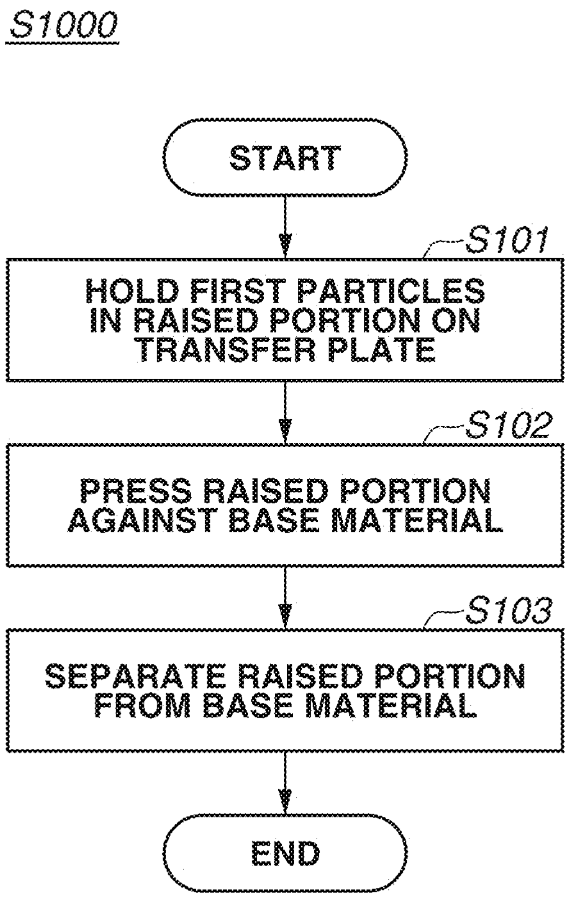
FIG. 1 is a transfer flowchart according to a first exemplary embodiment.

FIG. 1 is a flowchart S1000 regarding transfer of the particle pattern according to the first exemplary embodiment.

The flowchart S1000 regarding transfer according to the present exemplary embodiment includes the following steps (1) to (3). Details of each step will be described below.

- Step (1): a first step of causing a raised portion in the transfer plate to hold first particles (step S101).
- Step (2): a second step of pressing the transfer plate against a base material to press the raised portion against the base material (step S102).
- Step (3): a third step of separating the transfer plate from the base material to separate the raised portion from the base material (step S103).

Figure 2A:
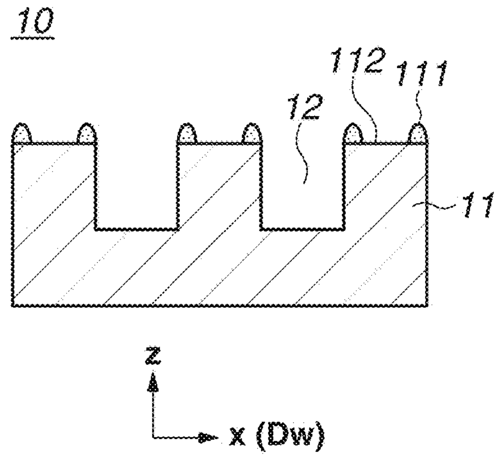
FIG. 2A is a cross-sectional view of a plate according to the first exemplary embodiment.
Figure 2B:
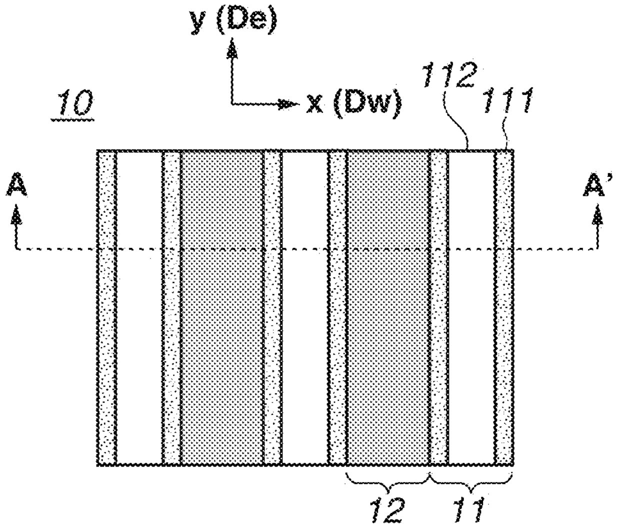
FIG. 2B is a plane view of a plate according to the first exemplary embodiment.
Figure 2C:
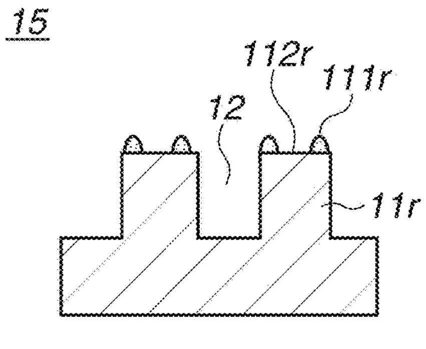
FIG. 2C is a cross-sectional view of a plate as a modification of the plate according to the first exemplary embodiment.
Figure 2D:
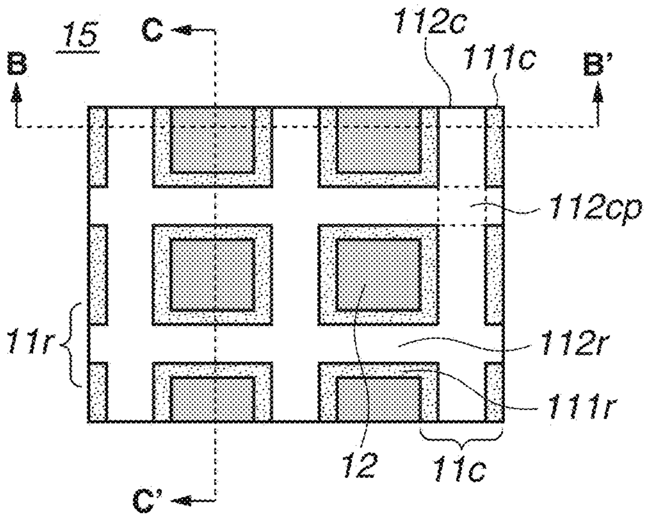
FIG. 2D is a plane view of the plate according to the modification of the first exemplary embodiment.

The transfer plate according to the first exemplary embodiment is now described in detail. FIG. 2A is a cross-sectional view of a transfer plate 10 according to the first exemplary embodiment. FIG. 2B is a plan view of the transfer plate 10 according to the first exemplary embodiment. FIG. 2C is a cross-sectional view of a transfer plate 15 according to a modification of the first exemplary embodiment. FIG. 2D is a plan view of the transfer plate 15 according to the modification of the first exemplary embodiment. The transfer plate 10 is a transfer plate including raised portions 11 and recessed portions 12 each extending in a predetermined direction and includes two protruding portions 111 extending in the predetermined direction at outer edge surfaces of the each of the raised portions 11. That is, the transfer plate 10 has a structure including a recessed region 112 on the surface of each of the raised portions 11. FIG. 2A corresponds to a cross section A-A' in FIG. 2B. A region with lower holding power to hold the first particles corresponds to each of the protruding portions 111 that are part of each of the raised portions 11 and that are arranged in a double-peak shape. A region with relatively higher holding power to hold the first particles is the recessed region 112 between the protruding portions 111 that are part of each of the raised portions 11 and that are arranged in the double-peak shape.

While the transfer plate 10 includes the raised portions 11 extending in the predetermined direction, the transfer plate 15 is different from the transfer plate 10 in that the transfer plate 15 includes raised portions arranged in a two-dimensionally extending grid pattern. In other words, the transfer plate 15 is a modification of the transfer plate 10 according to the first exemplary embodiment. The transfer plate 15 includes raised portions 11*r* extending in a row direction and raised portions 11 extending in a column direction. A region corresponding to an intersection between each raised portion 11*r* and each raised portion 11*c* constitutes an intersection raised portion 11*cp* that is continuous to each of the raised portion 11*r* and the raised portion 11*c*. A recessed region 112*cp* in the intersection raised portion 11*cp* is continuous to a recessed region 112*r* extending in the row direction and a recessed region 112*c* extending in the column direction. The recessed region 112*cp* in the intersection in the present modification may have a structure of being interposed between a pair of protruding portions arranged in a double-peak shape on the intersection raised portion 11*cp*. The pair of protruding portions is either a pair of protruding portions 111*r* extending in the row direction and arranged in the double-peak manner or a pair of protruding portions 111*c* extending in the column direction and arranged in the double-peak manner.

Figure 3A:
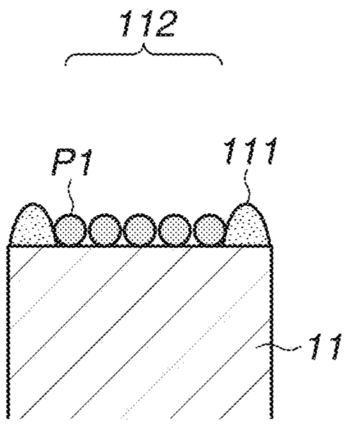
FIG. 3A is a step diagram illustrating a transfer step according to the first exemplary embodiment.
Figure 3B:
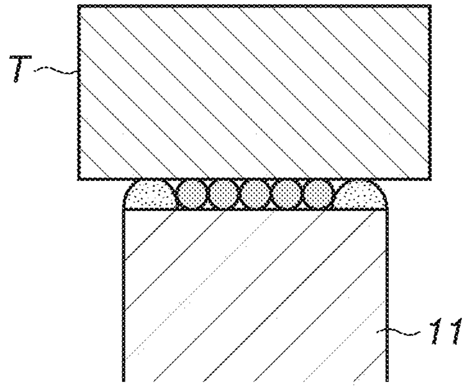
FIG. 3B is a step diagram illustrating the transfer step according to the first exemplary embodiment.
Figure 3C:
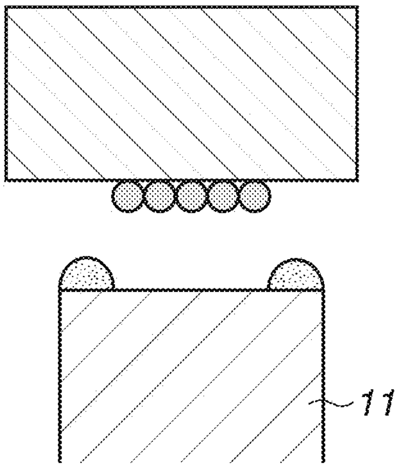
FIG. 3C is a step diagram illustrating the transfer step according to the first exemplary embodiment.

FIGS. 3A to 3C are step diagrams illustrating a transfer step according to the first exemplary embodiment and each specifically illustrating the surface of the raised portion 11 in the transfer plate 10. The first step S101 may include a step of rubbing a bearing material bearing the first particles against a transfer plate. "Rubbing the bearing material against the transfer plate" includes a case where the bearing material does not come in direct contact with the transfer plate itself. That is, the above-mentioned expression includes a case where the bearing material that bears the first particles is rubbed against the transfer plate and only the first particles come in contact with the transfer plate itself.

As illustrated in FIG. 1, in the first step S101, first particles P1 are held in the recessed region 112 on the surface of the raised portion 11 in the transfer plate 10. The first particles P1 may adhere also to a top surface and side surface of each of the protruding portions 111 of the raised portion 11. However, the first particles P1 are held on a priority basis in the recessed region 112, which is a gap between the protruding portions 111 arranged in the double-peak shape, due to distribution of holding power that is preliminarily given to the top surface (top face) of the protruding portions 111 in a width direction Dw. In a case where a rubbing step is adopted in step S101, particles are expected to drop into the recessed region 112 on the surface of the raised portion 11 or the recessed portion 12 by rubbing. In this step S101, an amount of first particles P1 adhering to the top portions and side surfaces of the protruding portions 111 becomes smaller than an amount of first particles P1 held in the recessed region 112 on the surface of the raised portion 11.

That is, the transfer plate 10 in the first exemplary embodiment has a structure in which a part of the raised portions 11 with higher holding power to hold the first particles P1 is interposed between parts of the raised portion 11 with lower holding power. Furthermore, in the second step S102, when the transfer plate 10 is pressed against the base material T, the first particles P1 held by the parts with lower holding power move to the part with relatively higher holding power and are stabilized.

The raised portion 11 in the transfer plate 10 in the first exemplary embodiment is characterized in having an elastic modulus that is lower than that of the first particles P1. That is, in the second step S102, when the transfer plate 10 is pressed against the base material T, the protruding portions 111 on the surface of the raised portion 11 in the transfer plate 10 in contact with the base material T is crushed to be deformed. That is, the protruding portions 111 are deformed in a manner that a width of the recessed region 112, having higher holding power and being interposed between the protruding portions 111 having lower holding power on the surface of the raised portion 11, is reduced. Thus, the first particles P1 held in the part with higher holding power are pressed against the base material T while spacing between the first particles P1 is narrowed. As a result, a high-density pattern that is higher in density than a pattern of the first particles P1 held in the first step S101 is transferred to the base material T. For the raised portion 11 in the present exemplary embodiment including the protruding portions 111 and the recessed region 112, it is possible to adopt a material having an elastic modulus that is lower than that of the first particles P1.

Step S101 may include a step of preparing the transfer plate 10 and a raw material plate Ts (not illustrated) that holds a material to be transferred (S100). Step S100 is, in other words, a step of preparing a second base material that holds the material to be transferred containing a plurality of solid particles P1 on at least one of surfaces of the second base material.

The material to be transferred has a dry mode in which the solid particles P1 are held on the raw material plate in a dry state and a wet mode in which a dispersion liquid in which the solid particles P1 are dispersed in a solvent or the like is spread on the raw material plate. The dispersion liquid in which the solid particles P1 are dispersed in the solvent or the like is, in other words, a suspension, slurry, a paste, or the like. In other words, since the solvent serves as a receiver when the solid particles P1 are spread as the liquid, the material to be transferred spread on the raw material plate contain a plurality of solid particles P1 and a fluid Fm in contact with the plurality of solid particles P1. The holding power of the base material T to hold the solid particles P1 is set to the amount higher than the holding power of the fluid Fm, which increases efficiency of transferring the solid particles P1 to the base material T in steps S102 and S103.

Figure 4A:
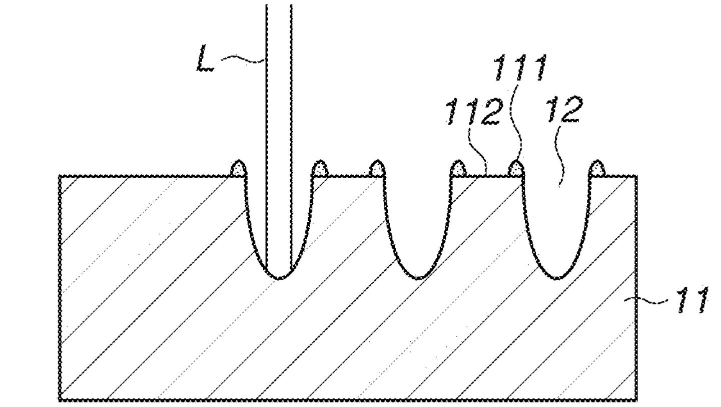
FIG. 4A is a diagram illustrating a step of a method of manufacturing the plate according to the first exemplary embodiment.
Figure 4B:
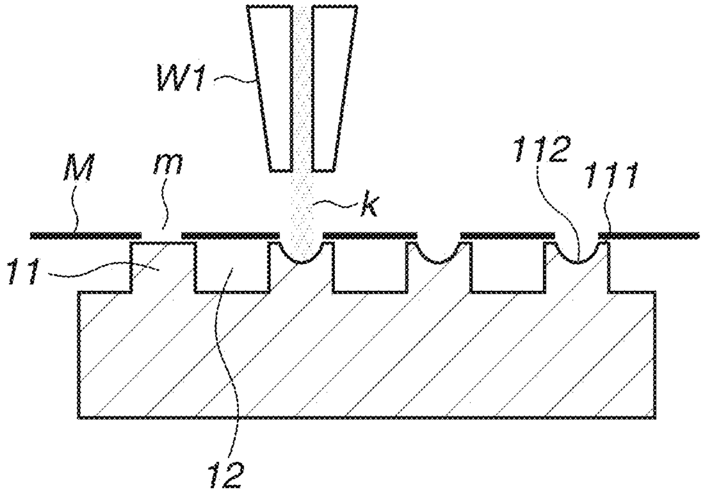
FIG. 4B is a diagram illustrating a step of a method of manufacturing the plate according to the first exemplary embodiment.

The method of manufacturing the transfer plate 10 according to the first exemplary embodiment is not specifically limited, and can be manufactured, for example, with use of a laser or a sandblast. FIGS. 4A and 4B are views each illustrating a step of manufacturing the transfer plate 10. FIG. 4A illustrates a state where a resin substrate is irradiated with a laser beam L, debris is generated in a part under the laser processing, and the protruding portions 111 are formed on the substrate of the raised portion 11. As a material of the resin substrate, it is possible to use an organic resin, such as an acrylic resin, a polyacetal resin, a polycarbonate resin, an acrylonitrile-butadiene-styrene (ABS) resin, and a polystyrene resin. A laser may be any laser capable of processing a resin substrate, and it is possible to use, for example, a CO2 laser. In the processing, it is possible to form, with the laser, the protruding portions 111 on the surface of the raised portion 11 simultaneously with the recessed portion 12 in the transfer plate 10. The height of each of the protruding portions 111 are adjustable by a laser processing condition. The recessed region 112 may be formed on the surface of the raised portion 11 by further execution of microfabrication in a middle of the raised portion 11 with the laser after formation of an uneven pattern. FIG. 4B illustrates a state where a mask M is installed on the resin substrate in which the uneven pattern is formed so that opening portions m are matched with the respective raised portions 11, the resin substrate is processed only in the opening portions m of the mask M with a sandblast W1, and the protruding portions 111 are thereby formed on the surface of the raised portion 11. At this time, abrasive particles k that are used in the sandblast W1 are desirably particles that are smaller in diameter than an opening width of each opening portion m of the mask M and that are harder than the resin substrate.

The bearing material according to the first exemplary embodiment is not specifically limited, and it is possible to select, for example, brush fiber, a rubber roller, or magnetic particles. As a rubber material of the rubber roller, it is possible to select silicone rubber, urethane rubber, acrylic rubber, nitrile rubber, and fluoro-rubber. It is desirable that a fiber diameter of brush fiber, a diameter of the rubber roller, and an average diameter of magnetic particles be sufficiently larger than the opening width of the recessed region 112 on the surface of the raised portion 11 in the transfer plate 10. With the fiber diameter of brush fiber, the diameter of the rubber roller, and the average diameter of magnetic particles being sufficiently larger than the opening width of the recessed region 112 on the surface of the raised portion 11, the first particles P1 held in the recessed region 112 on the surface of the raised portion 11 hard to be swept out, which further increases contact between the first particles P1.

As described above, according to the first exemplary embodiment, it is possible to provide the transfer plate 10 with a particle density that is increased by pressing at the time of transfer.

Second Exemplary Embodiment

Figure 5A:
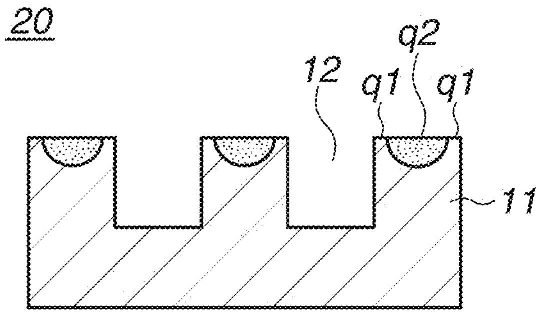
FIG. 5A is a cross-sectional view of a plate according to a second exemplary embodiment.

A method of forming a transfer plate for forming a particle pattern and a method of forming the particle pattern according to a second exemplary embodiment of the present invention will be described below with reference to the drawings. A plate in the second exemplary embodiment is similar to the plate in the first exemplary embodiment, but is different in having distribution of elastic moduli on the surface of the raised portion 11. FIG. 5A is a cross-sectional view illustrating a transfer plate 20 according to the second exemplary embodiment. The transfer plate 20 according to the second exemplary embodiment has a structure in which a region q2 with a lower elastic modulus is interposed between regions q1 with a higher elastic modulus on the surface of the raised portion 11, and the regions q1 and q2 extend in a predetermined direction. In the region q2 with the lower elastic modulus, a contact area between the first particles P1 and the transfer plate 20 is larger. In the regions q1 with the higher elastic modulus, a contact area between the first particles P1 and the plate 20 is smaller. That is, in the region q2 with the lower elastic modulus, adhesive force of the first particles P1 is higher than that in the regions q1 with the higher elastic modulus. That is, the transfer plate 20 in the second exemplary embodiment has a structure in which a region with higher holding power to hold particles is interposed between a region with lower holding power to hold particles.

A method of forming a linear pattern according to the present exemplary embodiment includes, similarly to the first exemplary embodiment, the step of causing the raised portion 11 in the transfer plate 10 to hold particles (the first step), the step of pressing the transfer plate 10 against the base material T (the second step), and the step of separating the transfer plate 10 from the base material T (the third step). As a result, the regions q1 with the higher elastic modulus are less likely to be deformed than the region q2 with the lower elastic modulus, whereby particles held in the regions q1 with the higher elastic modulus receive larger force than the region q2 with the lower elastic modulus. In this process, the first particles P1 easily escape to a region to which smaller force is applied. That is, particles held in the regions q1 with the higher elastic modulus easily escape to the region q2 with the lower elastic modulus, which leads to an increase in particle density of the regions q2 with the lower elastic modulus. Further pressing the transfer plate 10 against the base material T causes the regions q1 with the higher elastic modulus to start to be deformed, and the width of the region q2 with the lower elastic modulus is decreased. That is, by decreasing spacing between the first particles P1 held in the regions q2 with the lower elastic modulus, the first particles P1 are transferred to the base material T with the further increased particle density.

Figure 5B:
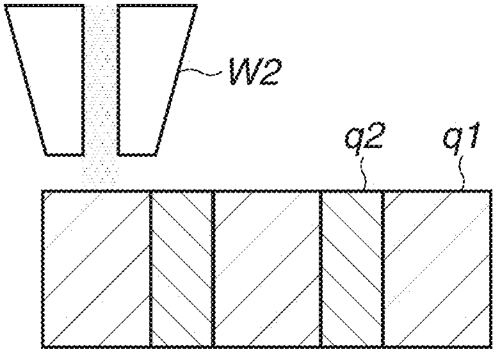
FIG. 5B is a diagram illustrating each step of manufacturing the plate according to the second exemplary embodiment.
Figure 5C:
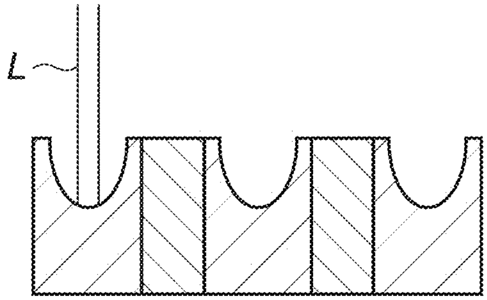
FIG. 5C is a diagram illustrating each step of manufacturing the plate according to the second exemplary embodiment.
Figure 5D:
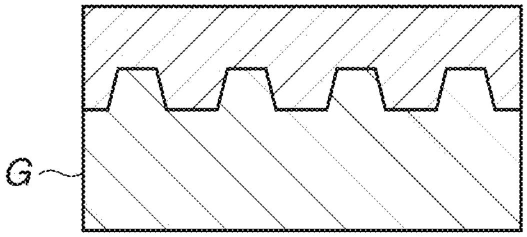
FIG. 5D is a diagram illustrating each step of manufacturing the plate according to the second exemplary embodiment.
Figure 5E:
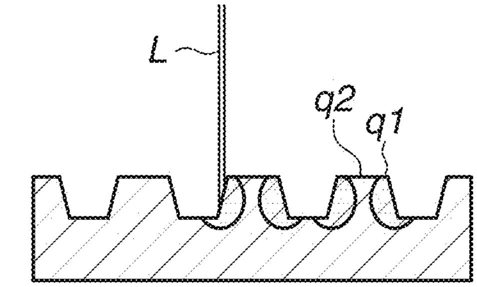
FIG. 5E is a diagram illustrating each step of manufacturing the plate according to the second exemplary embodiment.

The method of manufacturing the transfer plate 20 according to the second exemplary embodiment is not specifically limited, and it is possible to use, for example, resin injection or the curing action of a heat-curing resin. FIGS. 5B and 5C each illustrate a state where, after resins with different Young's moduli are alternately applied with an injection apparatus W2 and part of a portion with the higher Young's modulus is removed with the laser beam L, whereby an uneven pattern having distribution of elastic moduli is formed in the raised portion 11. As the injection apparatus W2 that injects resins, for example, a fused deposition modeling (FDM) method may be used. As a material with a higher Young's modulus, nylon, ABS, polylactic acid (PLA), or the like can be used. As a material with a lower Young's modulus, a thermoplastic polyurethane resin or the like may be used. Even in a case where an identical material is used, a filler, such as silica, may be mixed in the material to increase a Young's modulus. FIGS. 5D and 5E each illustrate a state where an uneven pattern having distribution of elastic moduli is formed in the raised portion 11 with the heat-curing resin. Specifically, the heat-curing resin, such as an epoxy resin, is poured into a mold G in which the uneven pattern is formed, and the epoxy resin is removed from the mold G when the epoxy resin is in a semi-cured state by control of a temperature and time, whereby the uneven pattern is obtained. An outer edge of the raised portion 11 is locally heated with the laser beam L, such a CO2 laser beam and an yttrium aluminum garnet (YAG) laser beam, and further cured, whereby the transfer plate 20 according to the second exemplary embodiment is obtained.

As described above, according to the second exemplary embodiment, it is possible to provide the transfer plate 20 having a particle density that is increased by pressing at the time of transfer.

Third Exemplary Embodiment

Figure 6A:
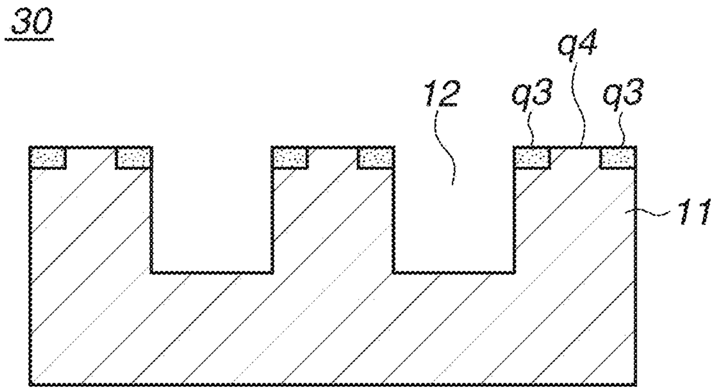
FIG. 6A is a cross-sectional view of a plate according to a third exemplary embodiment.

A method of forming a transfer plate for forming a particle pattern and a method of forming the particle pattern according to a third exemplary embodiment of the present invention will be described with reference to the drawings. A plate in the third exemplary embodiment is similar to the transfer plate 10 in the first exemplary embodiment and the transfer plate 20 in the second exemplary embodiment, but is different in having distribution of wettability on the surface of the raised portion 11. FIG. 6A is a cross-sectional view of a transfer plate 30 according to the third exemplary embodiment. The transfer plate 30 according to the third exemplary embodiment has a structure in which a region q4 with higher wettability is interposed between regions q3 with lower wettability on the surface of the raised portion 11 and the regions q3 and q4 extend in a predetermined direction. When a liquid, such as ink, is applied to the surface of the raised portion 11, the liquid is repelled in the regions q3 with lower wettability and spreads to wet the region q4 with higher wettability. That is, the liquid aggregates in the region q4 with higher wettability interposed between the regions q3 with lower wettability.

When the first particles P1 are caused to adhere to the raised portion 11, the first particles P1 adhere to the region q4 with higher wettability in which the liquid exists, while the first particles P1 hardly adhere to the region q3 with lower wettability. When the transfer plate 30 is pressed against the base material T, the region q4 that has higher wettability and to which the first particles P1 adhere starts to be deformed first, and the transfer plate 30 is brought into a state where the first particles P1 are embedded in the raised portion 11. When the transfer plate 30 is further pressed, the regions q3 with lower wettability comes in contact with the base material T and starts to be deformed, which decreases the width of the region q4 with higher wettability. That is, the region q4 is deformed in a manner that spacing between the first particles P1 is decreased.

As a result, a pattern with an increased density of the first particles P1 is transferred to the base material T.

Figure 6B:
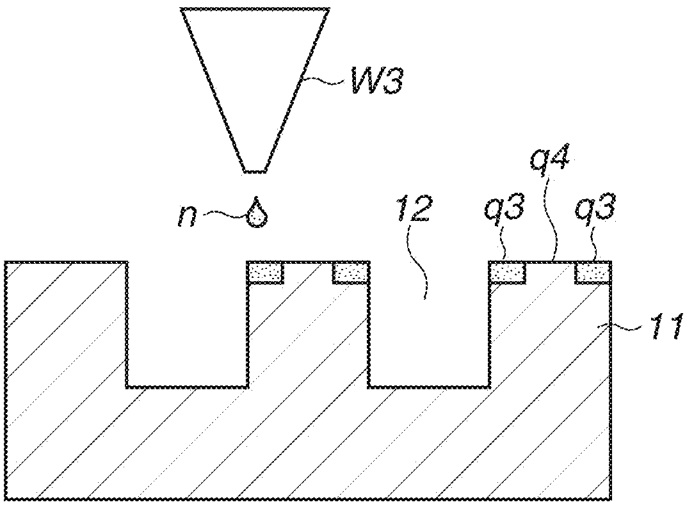
FIG. 6B is a diagram illustrating each step of manufacturing the plate according to the third exemplary embodiment.

A method of manufacturing the transfer plate 30 according to the third exemplary embodiment is not specifically limited, and it is possible to use, for example, a method of applying a hydrophobic material to provide distribution of wettability. FIG. 6B illustrates a state where a silane coupling agent n is used as the hydrophobic material to provide wettability to the raised portion 11. Specifically, after the uneven pattern is formed, the silane coupling agent n is applied to the outer edge of the raised portion 11, whereby the distribution of wettability is provided. As a means of applying the silane coupling agent n, it is possible to use an injection apparatus W3, such as an ink-jet apparatus and a dispenser. The silane coupling agent n to be used may be selected depending on a material of the transfer plate to which the silane coupling agent n is to be applied. By applying drops on the raised portion 11 having the distribution of wettability and formed in the above-described manner, it is possible to obtain the transfer plate 30 in which ink is repelled in the regions q3 at the outer edge of the raised portion 11 with higher hydrophobicity and lower wettability, and ink aggregates in the region q4 in a middle of the raised portion 11 with relatively higher wettability.

As described above, according to the third exemplary embodiment, it is possible to provide the transfer plate 30 with a particle density that is increased by pressing at the time of transfer.

The above-mentioned exemplary embodiments have the structure in which the raised portion 11 extending in the predetermined direction has distribution of holding power to hold particles in the width direction Dw orthogonal to a predetermined direction De in a manner that a region with higher holding power is interposed between regions with lower holding power. The raised portion 11 has a part with an elastic modulus that is lower than that of solid particles, whereby a width to maintain spacing between solid particles held by a region interposed between the protruding portions 111 arranged in the double-peak shape is restricted by elastic deformation caused by pressing and corresponding to a Poisson's ratio of the raised portion 11. As a result, it is possible to guarantee a particle density and transfer the linear pattern to the base material T. An extending direction of the linear pattern corresponds to the predetermined direction in which the raised portion 11 on the transfer plate extends. Thus, in a case where the raised portion 11 two-dimensionally extends on the transfer plate, the linear pattern is a two-dimensional linear pattern, and an extending mode of the raised portion 11 is not limited to a mode in which the raised portion 11 extends in one direction. The two-dimensional linear pattern includes a reticular pattern, a honeycomb pattern, a concentric pattern, and a radial pattern.

In the above-mentioned exemplary embodiments, particles are held in the raised portion of the transfer pattern in the first step S101, and the transfer plate is pressed against the base material in the second step S102, whereby the transfer pattern is transferred. As a modification of the exemplary embodiments, a step of removing particles adhering to the region with lower holding power to hold particles may be provided between the first step S101 and the second step S102. While, means of removing particles is not specifically limited, the air, vibrations, and the like may be used.

EXAMPLE

In the base material T to which the pattern of the first particles P1 obtained in the above-mentioned exemplary embodiments is transferred, second particles P2 different from the transferred first particles P1 are disposed in a region in which the first particles P1 are not transferred, whereby a pattern layer using a plurality of materials is obtained. The pattern layer includes a first region that contains a first inorganic material and in which a plurality of inorganic particles P10 prior to sintering processing is disposed, and a second region that contains a second inorganic material and in which a plurality of second inorganic particles P20 prior to sintering processing is disposed. By using a material containing a positive electrode material or negative electrode material of a lithium-ion battery or an all-solid-state battery or a material containing solid electrolyte, a composite electrode is obtained.

Step of Manufacturing Composite Electrode

Figure 7:
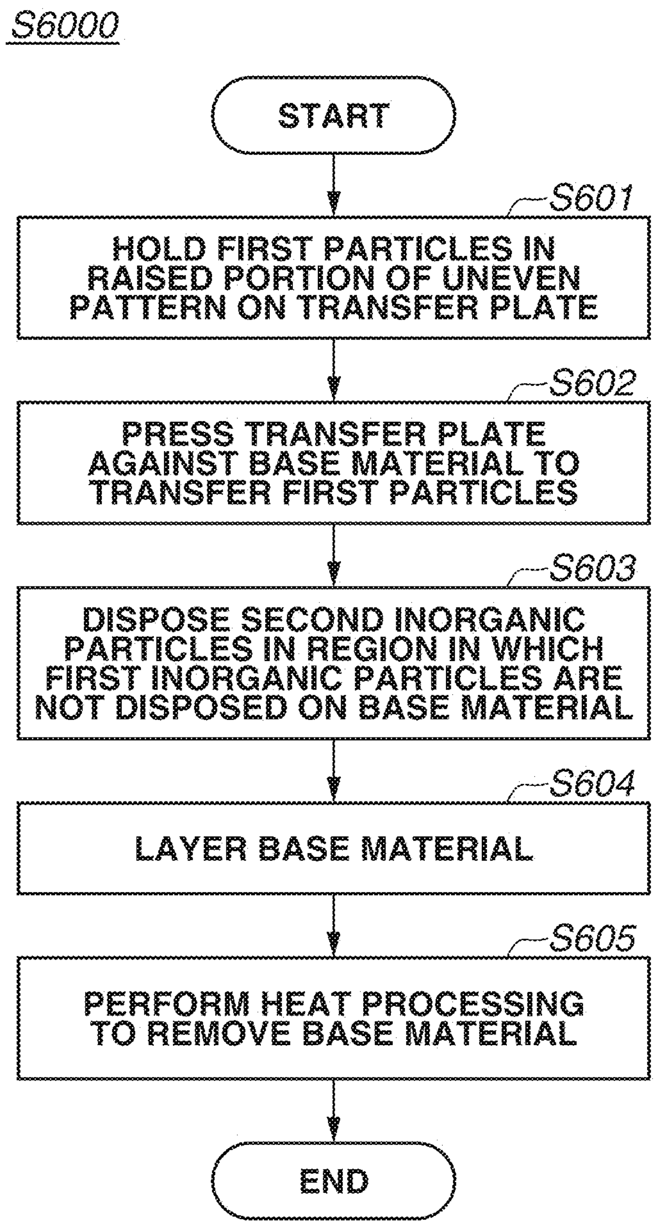
FIG. 7 is a flowchart illustrating a step of manufacturing a composite electrode.

FIG. 7 is a flowchart S6000 of manufacturing the composite electrode. The flowchart S6000 of manufacturing the composite electrode includes the following steps (1) to (5).

- Step (1): a first step of causing the raised portion in the transfer plate to hold first inorganic particles (step S601).
- Step (2): a second step of pressing the transfer plate against the base material to transfer the first inorganic particles (step S602).
- Step (3): a third step of disposing the second inorganic particles in a region in which the first inorganic particles are not arranged on the base material (step S603).
- Step (4): a step of layering the base material (step S604).
- Step (5): a step of performing heat processing to remove the base material (step S605).

In the method of forming the linear pattern according to the present exemplary embodiments, the third step S603 includes a step of rubbing a bearing material that bears the second inorganic particles P20 against the base material T in which the first inorganic particles P10 are disposed. In the third step S603, after the first inorganic particles P10 are disposed on the base material T, the bearing material that bears the second inorganic particles P20 is rubbed against the base material T, whereby the second inorganic particles P20 are disposed in high density in a region in which the first inorganic particles P10 are not disposed on the base material T. While the second inorganic particles P20 are, together with the bearing material, rubbed against the base material T, the second inorganic particles P20 are bound by adhesive force due to the surface of the base material T and adhesive force due to the first inorganic particles P10 and the second inorganic particles P20 disposed on the surface of the base material T and thereby disposed in high density. With this processing, it is possible to dispose a plurality of inorganic particles in any pattern and form the composite electrode layer in high density.

Inorganic Material

For example, the inorganic material is at least any one of a positive electrode material, an electrolyte, and a negative electrode material. Specific examples of the positive electrode material include combined metal oxide containing lithium, a chalcogen compound, and manganese dioxide. The combined metal oxide containing lithium is metal oxide containing lithium and transition metal or metal oxide in which part of transition metal in the metal oxide is substituted by exotic elements. Examples of the exotic elements include Na, Mg, Sc, Y, Mn, Fe, Co, Ni, Cu, Zn, Al, Cr, Pb, Sb, and B. There may be one kind of exotic element or two or more kinds of exotic elements. Among these elements, combined metal oxide containing lithium is desirable. Examples of the combined metal oxide containing lithium include $Li_xCoO_2$, $Li_xNiO_2$, $Li_xMnO_2$, $Li_xCo_yNi_{1-y}O_2$, $Li_xCo_yMn_{1-y}O_z$, $Li_xNi_{1-y}M_yO_z$, and $Li_xMn_2O_4$. Examples of the combined metal oxide containing lithium further include $Li_xMn_{2-y}M_yO_4$, $LiMPO_4$, and $Li_2MPO_4F$. In the above-mentioned formulas, M is at least one kind of element selected from a group consisting of Na, Mg, Sc, Y, Mn, Fe, Co, Ni, Cu, Zn, Al, Cr, Pb, Sb, V, and B. In the above-mentioned formulas, x, y, and z hold relations of $0<x\leq1.2$, $0<y<0.9$, and $2.0\leq z\leq2.3$. Examples of the combined metal oxide containing lithium further include $LiMeO_2$ (in the formula, Me=MxMyMz where Me and M are transition metals, and x+y+z=1).

Specific examples of the combined metal oxide containing lithium include $LiCoO_2$ (LCO: lithium cobalt oxide) and $LiNi_{0.5}Mn_{1.5}O_4$ (LNMO: lithium manganese nickel oxide). Specific examples of the combined metal oxide containing lithium include $LiFePO_4$ (LFP: lithium ferrous phosphate), and $Li_3V_2(PO_4)_3$ (LVP: lithium vanadium phosphate). The above-mentioned positive electrode material may contain a conductive auxiliary agent. Examples of the conductive auxiliary agent include graphite, such as natural graphite and artificial graphite, and carbon black, such as acetylene black, Ketjen black, channel black, furnace black, lampblack, and thermal black. Examples of the conductive auxiliary agent include conductive fiber, such as carbon fiber, carbon nanotubes, and metal fiber, metallic powder, such as fluorocarbon and aluminum, conductive whiskers, such as zinc oxide, conductive metal oxide, such as titanium oxide, and an organic conductive material, such as phenylene dielectrics.

Examples of the electrolyte material include an oxide solid electrolyte, a sulfide solid electrolyte, a complex hydride solid electrolyte, a boride solid electrolyte, and a boron oxide solid electrolyte. Examples of the oxide solid electrolyte include a nasicon-type compound, such as $Li_{1.5}Al_{0.5}Ge_{1.5}(PO_4)_3$ and $Li_{1.3}Al_{0.3}Ti_{1.7}(PO_4)_3$, and a garnet-type compound, such as $Li_{6.25}La_3Zr_2Al$ 0.250 12. Examples of the oxide solid electrolyte include a perovskite-type compound, such as Li 0.33Li 0.55TiO 3. Examples of the oxide solid electrolyte include a silicon type compound, such as Li 14Zn (GeO 4) 4 and an oxide compound, such as Li 3PO 4, Li 4SiO 4, and Li 3BO 3. Specific examples of the sulfide solid electrolyte include Li 2S—SiS 2, LiI—Li 2S—SiS 2, LiI—Li 2S—P 2S 5, LiI—Li 2S—P 20 5, LiI—Li 3PO 4-P 2S 5, Li 2S—P 2S 5. Alternatively, the solid electrolyte may be a crystalline material, an amorphous material, or glass ceramics. Li 2S—P 2S 5 or the like means the sulfide solid electrolyte formed of a raw material containing Li 2S and P 2S 5.

Examples of the negative electrode material include metal, metal fiber, a carbon material, oxide, nitride, silicon, a silicon compound, tin, a tin compound, and various kinds of an alloy material. Among these materials, oxide, a carbon material, silicon, a silicon compound, tin, a tin compound, and the like are desirable. Examples of oxide include Li 4Ti 5O 12 (LTO: lithium titanate). Examples of the carbon material include various kinds of natural graphite (graphite), coke, graphitizing carbon, carbon fiber, spherical carbon, various kinds of artificial graphite, and amorphous carbon. Examples of the silicon compound include an alloy containing silicon, an inorganic compound containing silicon, an organic compound containing silicon, and a solid solution.

Examples of the tin compound include SnO b ($0<b<2$), SnO 2, SnSiO 3, Ni 2Sn 4, and Mg 2Sn. The above-mentioned negative electrode materials may contain a conductive auxiliary agent. Examples of the conductive auxiliary agent include graphite, such as natural graphite and artificial graphite, and carbon black, such as acetylene black, Ketjen black, channel black, furnace black, lampblack, and thermal black. Other examples of the conductive auxiliary agent include conductive fibers, such as carbon fiber, carbon nanotubes, and metal fiber, metallic powder, such as fluorocarbon and aluminum, conductive whiskers, such as zinc oxide, conductive metal oxide, such as titanium oxide, and an organic conductive material, such as phenylene dielectrics.

As the first inorganic particles P10 and the second inorganic particles P20, an identical material may be used or mutually different materials may be used. A plurality of kinds of particles may be mixed in the first region.

As a desirable combination of the first inorganic particles P10 and the second inorganic particles P20, the positive electrode material or the negative electrode material as the inorganic particles P10 and the electrolyte material as the second inorganic particles P20 are desirably combined.

A particle diameter (average particle diameter) of each of the first inorganic particles P10 and the second inorganic particles P20 is, for example, 0.05 micrometers (μm) or more and 100 μm or less (large range), desirably 0.1 μm or more and 50 μm or less (middle range), and more desirably 0.5 μm or more and 25 μm or less (small range).

In terms of density, it is desirable that the first inorganic particles P10 and the second inorganic particles P20 have a smaller particle diameter, but a lower limit is set to prevent an increase in material cost and a deterioration of aggregability. An upper limit is set to prevent a decrease in density. The average particle diameter is, for example, measured by a particle diameter distribution measurement apparatus of a laser diffraction/scattering type.

Base Material

The base material T desirably has thermal degradability or dissolubility in a solvent, which is different from the above-mentioned inorganic materials. For example, the base material may be composed of an organic material, such as polyethylene terephthalate and polyester. Furthermore, to cause the first inorganic particles P10 and the second inorganic particles P20 to adhere to the base material T, the base material T desirably includes an adhesive layer obtained by application of an adhesive to the surface of an organic material. As the adhesive, an acrylic adhesive, a urethane adhesive, and a silicone adhesive may be used.

Layering

Figure 8A:
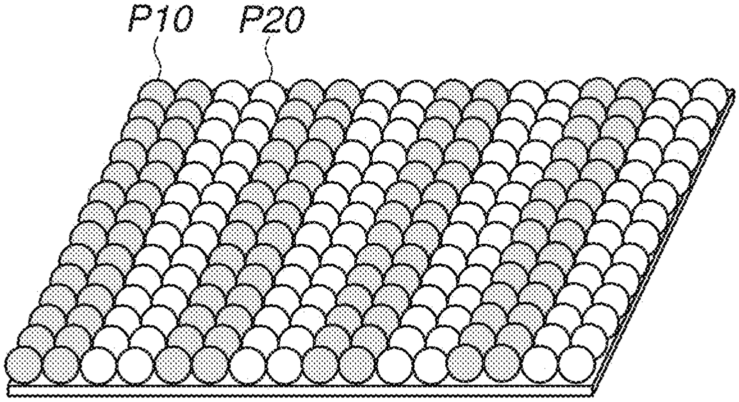
FIG. 8A is a step diagram illustrating a lamination transfer step in the step of manufacturing the composite electrode.
Figure 8B:
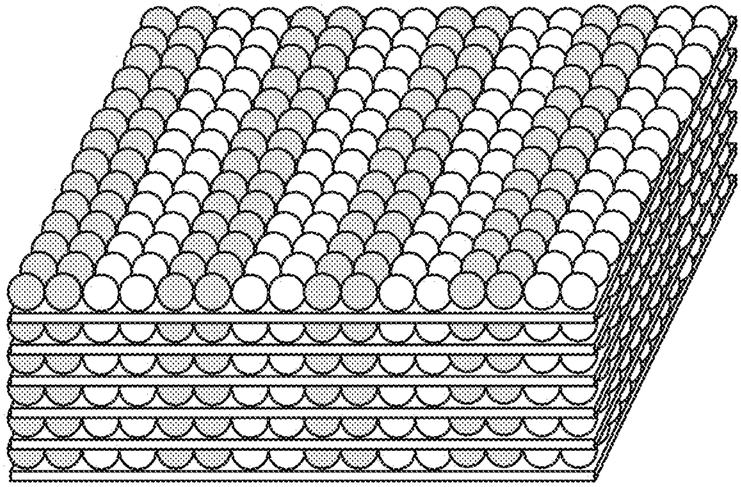
FIG. 8B is a step diagram illustrating a lamination transfer step in the step of manufacturing the composite electrode.

The fourth step S604 is a step of layering the obtained composite electrode layers. FIGS. 8A and 8B each illustrate a state where composite electrode layers are layered to obtain a composite electrode layered body. In this process, in step S604, it is desirable that the composite electrode layers be aligned and layered in such a manner that in upper and lower layered electrode layers, patterns of the first inorganic particles P10 have contact with each other and patterns of the second inorganic particles P20 have contact with each other. With this alignment, it is expected to increase in electron conductivity and ion conductivity of the composite electrode obtained in the fifth step, which will be described below.

Heat Processing

In the fifth step S605, the composite electrode layered body obtained in the fourth step is heated, whereby the base material T is thermally decomposed and removed. It is desirable that a heating temperature be a thermal decomposition temperature of the base material T or higher, and less than a thermal decomposition temperature of the first inorganic particles P10 and the second inorganic particles P20. With this operation, only the base material T is removed, whereby the composite electrode is obtained.

Step of Manufacturing Secondary Battery

Figure 9:
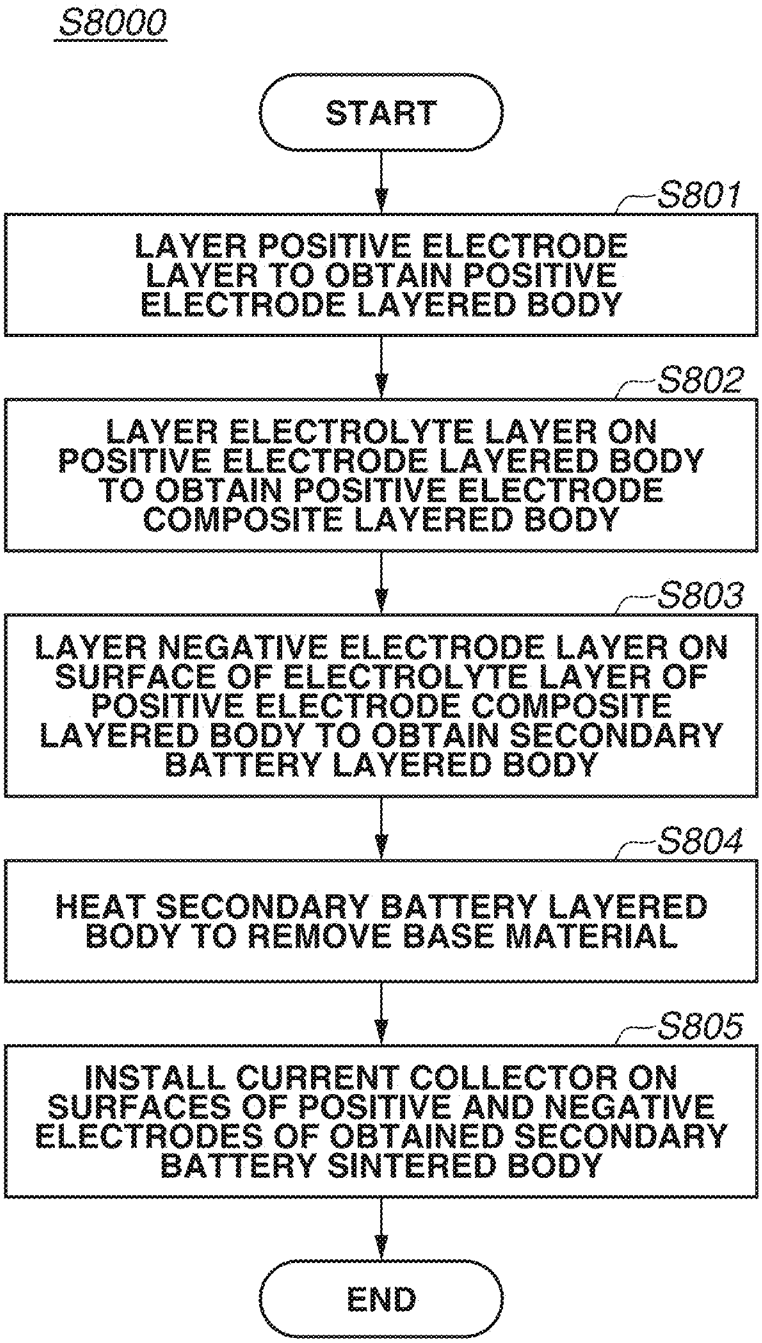
FIG. 9 is a flowchart illustrating a step of manufacturing a secondary battery.

While the step of manufacturing the composite electrode has been described above, it is possible to manufacture a secondary battery by sequentially layering the composite electrode serving as a positive electrode, the solid electrolyte serving as a separator, and the composite electrode layer serving as a negative electrode and performing heat processing. FIG. 9 is a flowchart S8000 of manufacturing the secondary battery. The flowchart of manufacturing the secondary battery includes the following steps (1) to (5).

Step (1): a step of layering a positive electrode layer to obtain a positive electrode layered body (step S801).

Step (2): a step of layering an electrolyte layer on the positive electrode layered body to obtain a positive electrode composite layered body (step S802).

Step (3): a step of layering the negative electrode layer on the electrolyte surface of the positive electrode composite layered body to obtain a secondary battery layered body (step S803).

Step (4): a step of heating the secondary battery layered body to remove the base material (step S804).

Step (5): a step of installing a current collector on the surfaces of the positive and negative electrodes of an obtained secondary battery sintered body (step S805).

The first step S801 to the fourth step S804 are similar to the above-mentioned steps of manufacturing the composite electrode. The electrolyte layer is a layer in which one kind or more kinds of electrolytes are disposed on the base material T. In the fifth step S805, the current collector is installed on the surfaces of the positive and negative electrodes of the obtained sintered body, whereby the secondary battery is obtained. It is possible to use metal foil, such as aluminum foil and copper foil, as the current collector. To increase adhesiveness, a cold isostatic pressing (CIP) apparatus or the like may perform pressure treatment after the current collector is installed.

Figure 10A:
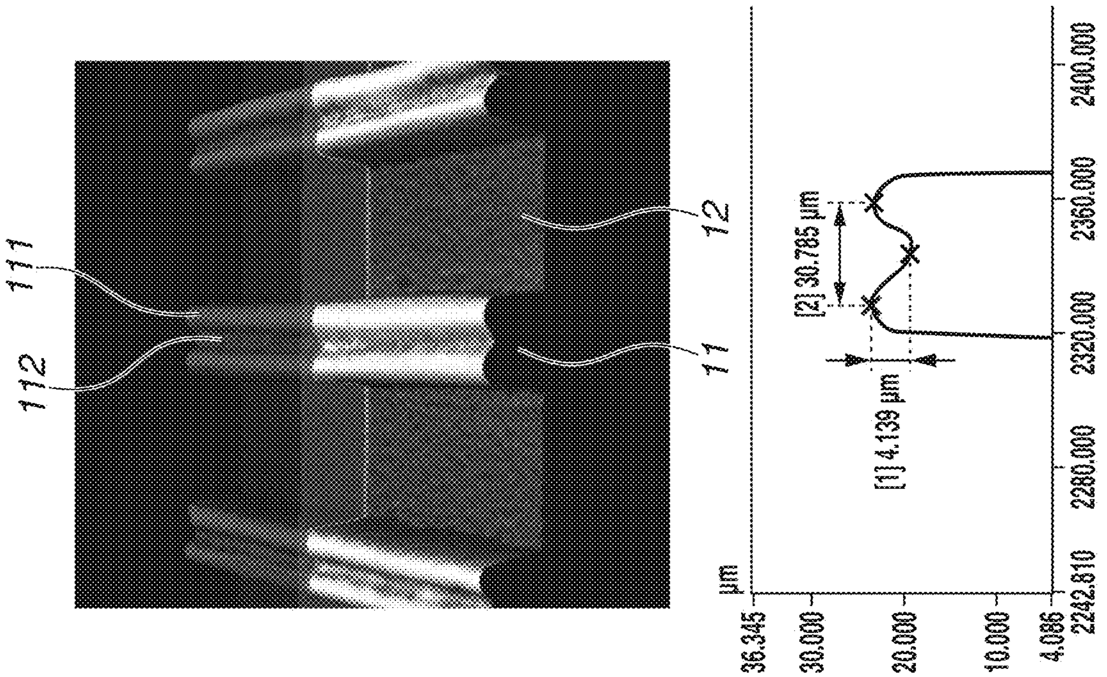
FIG. 10A is a view illustrating a shape of the plate according to the first exemplary embodiment.
Figure 10B:
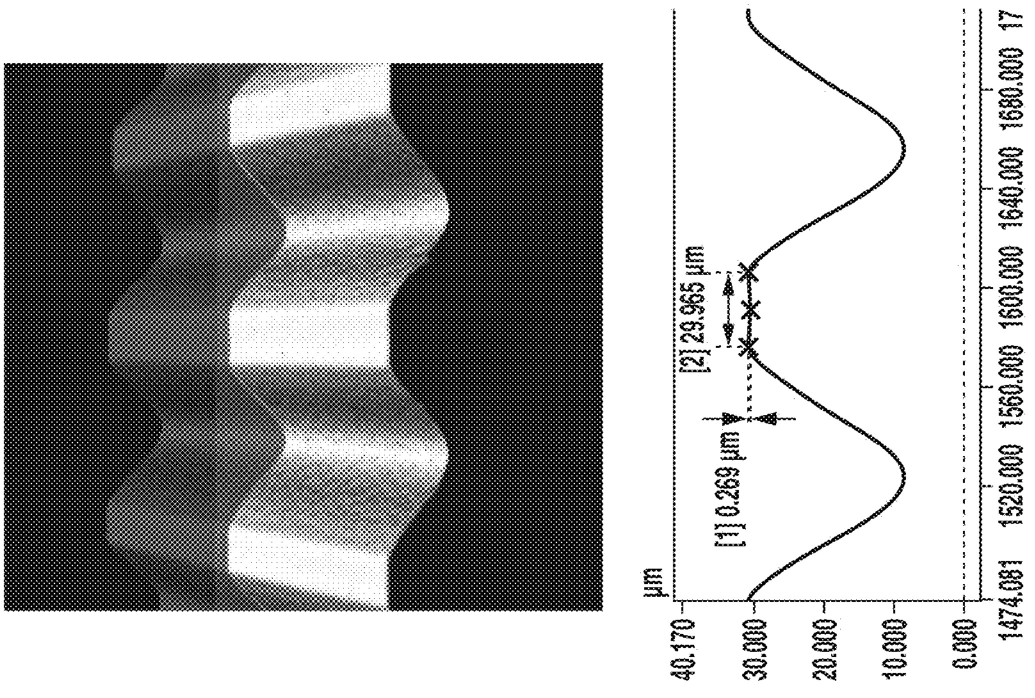
FIG. 10B is a view illustrating a shape of a plate according to Comparative Example.

FIG. 10A is a view illustrating a shape measurement result especially of the raised portion 11, which is obtained by the method of forming the linear pattern according to the first exemplary embodiment, in the transfer plate 10. As illustrated in FIG. 10A, the transfer plate 10 has a structure in which the raised portion 11 is provided with the protruding portions 111, and the recessed region 112 is further formed on the surface of the raised portion 11. Shape measurement was performed with use of a laser microscope VK-X1050 (manufactured by Keyence Corporation). A material of the transfer plate 10 was a polyacetal resin, and the transfer plate 10 was processed by a CO2 laser VLS 2.30 (Universal Laser Systems Co., Ltd.). The recessed portion was subjected to laser processing multiple times, whereby the protruding portions 111 were formed as debris on the surface of the raised portion 11. That is, the raised portion 11 and the protruding portions 111 on the surface of the raised portion 11 were made of an identical material. FIG. 10B is a view illustrating a raised portion of a transfer plate to be used in a method of forming a linear pattern according to Comparative Example. As illustrated in FIG. 10B, regarding protruding portions arranged in a double-peak shape in the raised portion in the transfer plate according to Comparative Example, an uneven pattern was formed by single laser processing and debris inhibits the formation of a protruding portion, whereby the uneven pattern without a protruding portion in the raised portion was obtained. In each of FIGS. 10A and 10B, a resin solution was applied. In the resin solution, Alkox EP-1010N (Meisei Chemical Works, Ltd.) as a water-soluble thermoplastic resin was dissolved in a solvent. As the solvent, a solvent obtained by blending of ethanol and water with a ratio by weight of 9:1 was used and prepared to have a solid content concentration of 15 wt %. After the applied resin solution was dried, the uneven pattern was heated to 60 C, whereby EP-1010N was softened and inorganic particles were applied to the raised portion. The uneven pattern of the raised portion in the transfer plate in the present specification is, in other words, a height profile of the raised portion.

As the first inorganic particles P10 and the second inorganic particles P20, any one of LiCoO 2 (hereinafter referred to as LCO), Li 1.5Al 0.5Ge 1.5P 30 12 (hereinafter referred to as LAGP), Li 3BO 3 (hereinafter referred to as LBO), and graphite was used. Lithium cobalt oxide LCO is a positive electrode material. Each of aluminum-substituted lithium germanium phosphate LAGP and lithium borate LBO is a material containing a solid electrolyte. Graphite is a negative electrode material. As lithium cobalt oxide LiCoO 2, the one manufactured by Nippon Chemical Industrial Co., Ltd. may be used. Similarly, Li 1.5Al 0.5Ge 1.5P 30 12 may be used. As lithium borate Li 3BO 3, the one manufactured by Toshima Manufacturing Co., Ltd. may be used. As graphite, SGP-5 manufactured by SEC Carbon, Ltd. may be used.

Figure 11A:
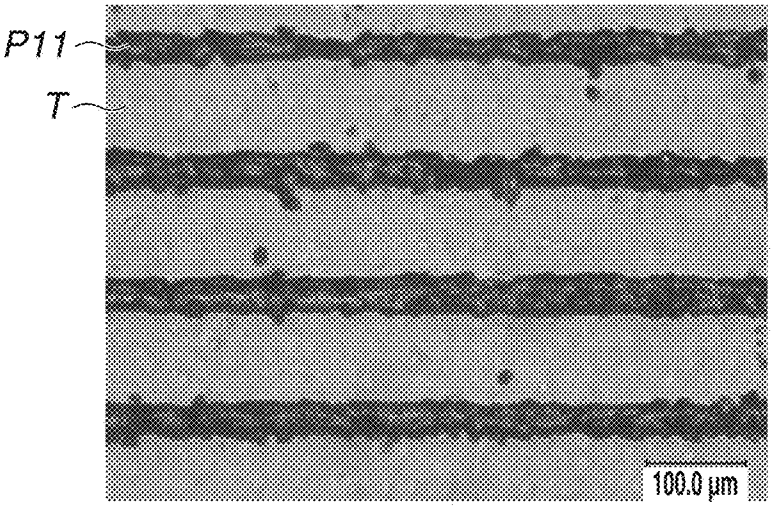
FIG. 11A illustrates a particle pattern image obtained by transfer of first particles to a base material by using the plate according to the first exemplary embodiment.
Figure 11B:
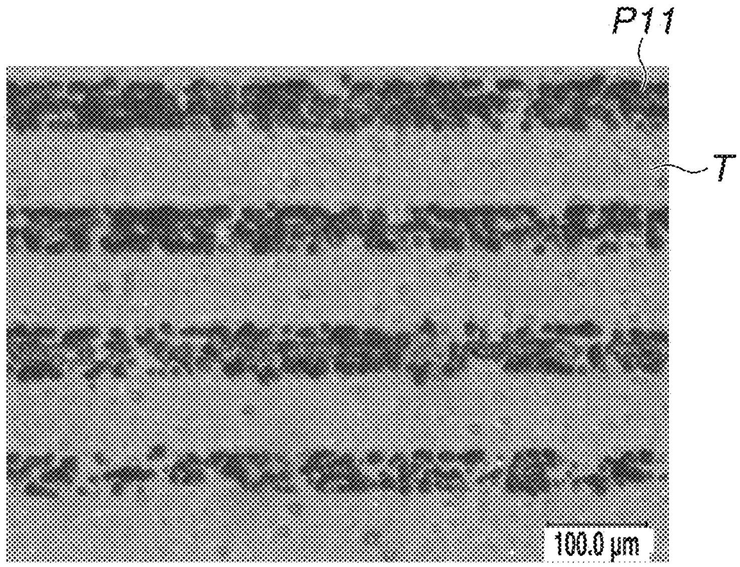
FIG. 11B illustrates a particle pattern image obtained by transfer of the first particles to the base material by using the plate according to Comparative Example.
Figure 12A:
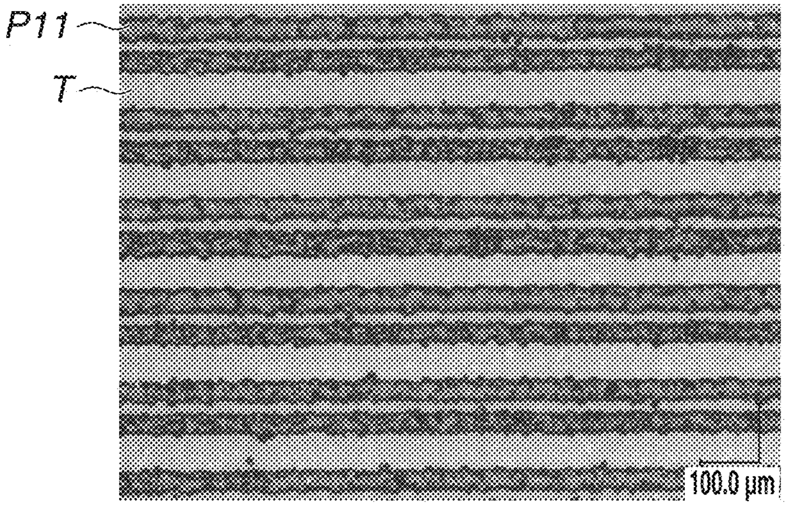
FIG. 12A is a view illustrating the base material in which the first particles are disposed using the plate according to the first exemplary embodiment.
Figure 12B:
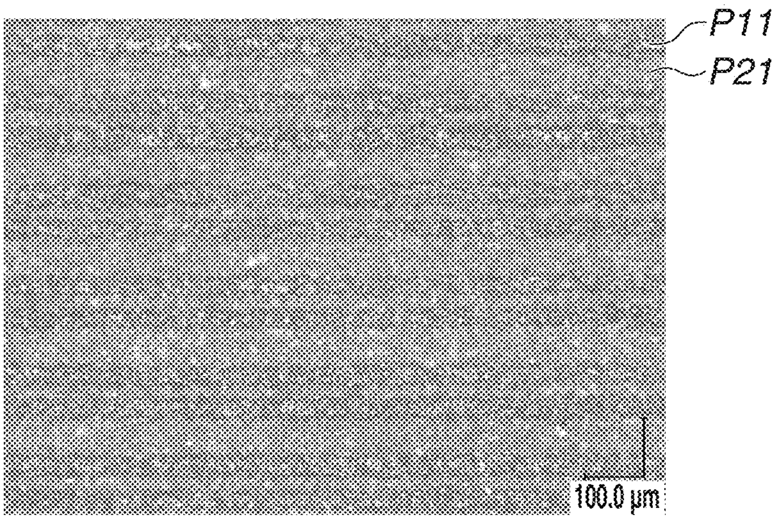
FIG. 12B is a view illustrating the base material in which second particles are disposed using the plate according to the first exemplary embodiment.

FIGS. 11A and 11B illustrate linear patterns formed by transfer of LCO particles P11 onto the base material T and arraying the LCO particles P11 as the first inorganic particles P1 with use of the respective transfer plates illustrated in FIGS. 10A and 10B. However, a water-soluble thermoplastic resin to cause the raised portion 11 to hold the LCO particles P11 is also transferred together with the LCO particles P11. As illustrated in FIG. 11A, the pattern of LCO particles P11 formed on the base material T and corresponding to Example is a pattern in which the LCO particles P11 aggregate due to the protruding portions 111 on the surface of the raised portion 11. In contrast, as illustrated in FIG. 11B, the pattern of LCO particles P11 formed on the base material T and corresponding to Comparative Example is a pattern in which the LCO particles P11 are discrete and do not aggregate. FIG. 12A illustrates a pattern corresponding to Example in FIG. 11A and formed by transfer of the LCO particles P11 twice while a transfer position is shifted in a line width direction of the LCO particles P11 in a manner that a coverage rate of the LCO particles P11 to cover the base material T becomes 50%. In FIG. 12B, LBO particles P21 as second particles are disposed in a part without LCO particles P11 on the base material T illustrated in FIG. 11A. LAGP was used in the solid electrolyte layer to form the secondary battery. The linear pattern of the LCO particles P11 corresponding to Comparative Example and illustrated in FIG. 11B was formed in similar steps and the secondary battery was formed.

Evaluation of Battery Performance

Figure 13:
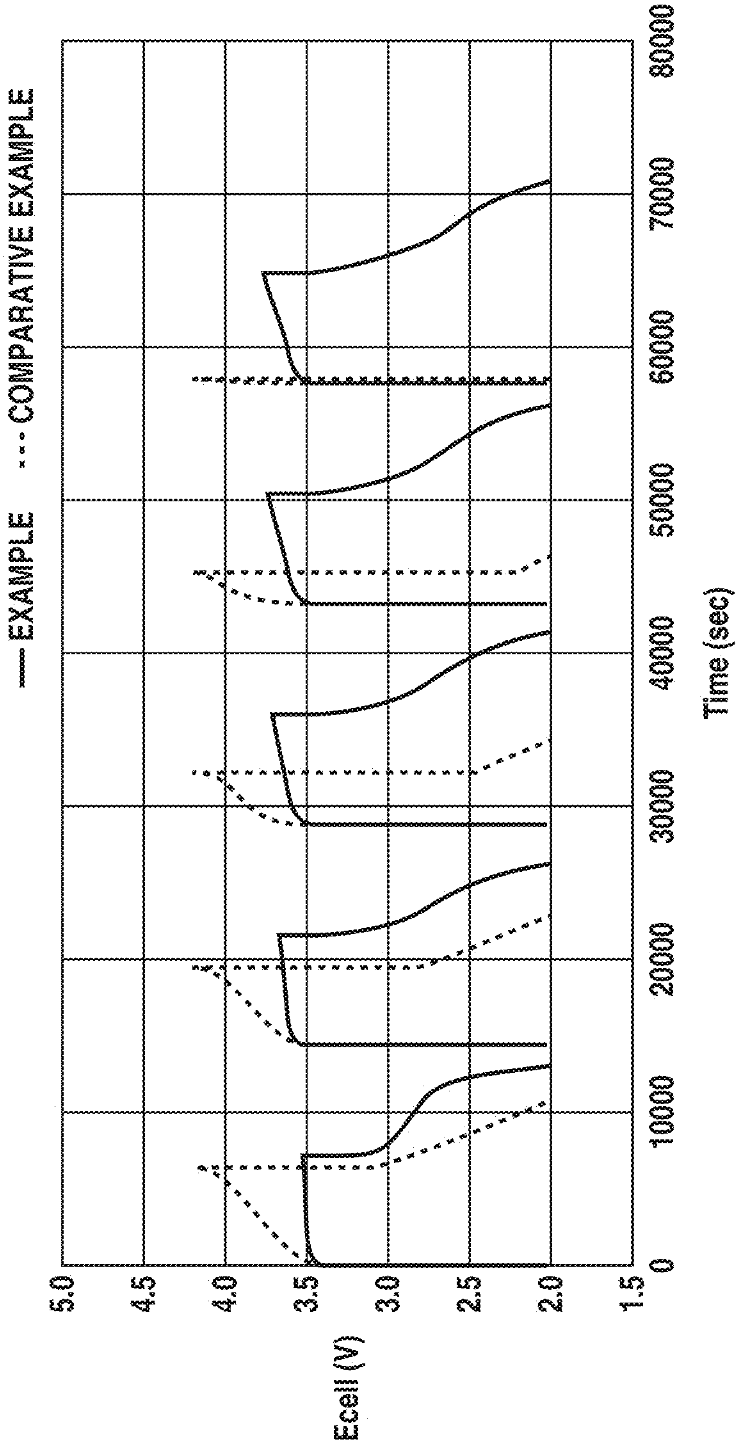
FIG. 13 is a graph for comparing performance of a secondary battery according to Example and a performance of a secondary battery according to Comparative Example.

FIG. 13 illustrates a result of evaluation of discharge and charge of the secondary battery formed as described above. With an amount of current equivalent to 0.2C (1C is an amount of current to fully charge the secondary battery in one hour), the secondary battery was charged for two hours and thereafter discharged for two hours. A charge and discharge test was conducted with use of an electrochemical apparatus (1255WB manufactured by Solartron Analytical). A charging upper limit potential of a positive electrode active material was set at 4.2 V and a discharging lower limit potential of the positive electrode active material was set at 2.0 V. As a result of the discharge and charge test, the secondary battery formed in Example has been stably charged and discharged, while the secondary battery formed with the pattern in which particles did not aggregate as Comparative Example has been failed to be satisfactorily charged and discharged, and battery performance was greatly exacerbated. In the secondary battery formed in Example, it is thought that LCO particles aggregated, resulting in an increase of contact between LCO particles and an improvement in battery performance. In contrast, in the pattern in which LCO particles did not aggregate as Comparative Example, it is thought that a conductive path was small, resulting in an increase of LCO particles that could not contribute to charge and discharge, which leads to an increase of internal resistance, and a decrease of battery performance.

As described above, according to Example, it is possible to provide the technique of transferring the fine linear pattern including solid particles with use of the transfer plate of the present invention. Furthermore, with use of a material constituting an all-solid-state battery as solid particles, it is possible to increase battery performance.

The exemplary embodiments described in the present specification includes the following first to fifteenth inventions.

The first invention includes a forming method of a linear pattern, comprising: bringing a transfer plate including a raised portion extending in a predetermined direction and a material to be transferred containing solid particles into contact with each other and causing the raised portion to hold the solid particles; pressing the raised portion against a base material; and separating the raised portion from the base material, wherein the raised portion has distribution of holding power to hold the material to be transferred in a width direction orthogonal to the predetermined direction in a manner that a region with higher holding power is interposed between regions with lower holding power, and has a portion with an elastic modulus that is lower than an elastic modulus of the solid particles.

The second invention includes the forming method according to the first invention, wherein the distribution of holding power corresponds to distribution of heights of the raised portion in the width direction.

The third invention includes the forming method according to the second invention, wherein the raised portion includes protruding portions that protrude in different positions in the width direction, that extend along the predetermined direction, and that are in a double-peak shape.

The fourth invention includes the forming method according to any one of first to third inventions, wherein the distribution of holding power corresponds to distribution of elastic moduli of the raised portion in the width direction.

The fifth invention includes the forming method according to the fourth invention, wherein the raised portion has the distribution of elastic moduli in the width direction in a manner that a region with a lower elastic modulus is interposed between regions with a higher elastic modulus, the region with the lower elastic modulus and the regions with the higher elastic modulus extending in the predetermined direction.

The sixth invention includes the forming method according to any one of first to fourth inventions, wherein the distribution of holding power corresponds to distribution of wettability of the raised portion with respect to the material to be transferred in the width direction.

The seventh invention includes the forming method according to the sixth invention, wherein the raised portion has the distribution of wettability with respect to the material to be transferred in the width direction in a manner that a region with higher wettability is interposed between regions with lower wettability, the region with higher wettability and the regions with lower wettability extending in the predetermined direction.

The eighth invention includes the forming method according to the first or second invention, wherein the raised portion includes a portion that also extends in another direction that is different from the predetermined direction.

The ninth invention includes the forming method according to the first or second invention, wherein the solid particles contain at least one of metal oxide, metal nitride, and metal boride.

The tenth invention includes the forming method according to the first or second invention, wherein the base material has higher holding power to hold the solid particles than holding power in the region with higher holding power.

The eleventh invention includes the forming method according to the tenth invention, wherein the material to be transferred contains the solid particles and a fluid in contact with the solid particles.

The twelfth invention includes the forming method according to the eleventh invention, wherein the base material has holding power to hold the solid particles higher than holding power of the fluid.

The thirteenth invention includes the forming method according to the first or second invention, wherein the causing the raised portion to hold the solid particles includes preparing the transfer plate and a raw material plate that holds the material to be transferred.

The fourteenth invention includes the forming method according to the thirteenth invention, wherein the causing the raised portion to hold the solid particles is performed by bringing the material to be transferred that is held by the raw material plate and the raised portion included in the transfer plate into contact with each other.

The fifteenth invention includes an invention according to a transfer plate to transfer a linear pattern including a plurality of solid particles to a base material. The transfer plate according to the fifteenth invention includes a raised portion that extends in a predetermined direction, wherein the raised portion has distribution of holding power to hold a material to be transferred in a width direction orthogonal to the predetermined direction in a manner that a region with higher holding power is interposed between regions with lower holding power. The transfer plate according to the fifteenth invention further has a portion with an elastic modulus that is lower than an elastic modulus of the solid particles.

The present invention is not limited to the above-described exemplary embodiments, and various modifications and variations can be made without departing from the spirit and scope of the invention. Therefore, the following claims are attached to publicly disclose the scope of the present invention.

According to the present invention, it is possible to provide the method of forming a particle pattern that allows a desired material to be disposed with a high density in any pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A forming method of a linear pattern, comprising:

bringing a transfer plate including a raised portion extending in a predetermined direction and a material to be transferred containing solid particles into contact with each other and causing the raised portion to hold the solid particles;

pressing the raised portion against a base material; and separating the raised portion from the base material, wherein the raised portion has distribution of holding power to hold the material to be transferred in a width direction orthogonal to the predetermined direction in a manner that a region with higher holding power is interposed between regions with lower holding power, and has a portion with an elastic modulus that is lower than an elastic modulus of the solid particles.

2. The forming method according to claim 1, wherein the distribution of holding power corresponds to distribution of heights of the raised portion in the width direction.

3. The forming method according to claim 2, wherein the raised portion includes protruding portions that protrude in different positions in the width direction, that extend along the predetermined direction, and that are in a double-peak shape.

4. The forming method according to claim 1, wherein the distribution of holding power corresponds to distribution of elastic moduli of the raised portion in the width direction.

5. The forming method according to claim 4, wherein the raised portion has the distribution of elastic moduli in the width direction in a manner that a region with a lower elastic modulus is interposed between regions with a higher elastic modulus, the region with the lower elastic modulus and the regions with the higher elastic modulus extending in the predetermined direction.

6. The forming method according to claim 1, wherein the distribution of holding power corresponds to distribution of wettability of the raised portion with respect to the material to be transferred in the width direction.

7. The forming method according to claim 6, wherein the raised portion has the distribution of wettability with respect to the material to be transferred in the width direction in a manner that a region with higher wettability is interposed between regions with lower wettability, the region with higher wettability and the regions with lower wettability extending in the predetermined direction.

8. The forming method according to claim 1, wherein the raised portion includes a portion that also extends in another direction that is different from the predetermined direction.

9. The forming method according to claim 1, wherein the solid particles contain at least one of metal oxide, metal nitride, and metal boride.

10. The forming method according to claim 1, wherein the base material has higher holding power to hold the solid particles than holding power in the region with higher holding power.

11. The forming method according to claim 10, wherein the material to be transferred contains the solid particles and a fluid in contact with the solid particles.

12. The forming method according to claim 11, wherein the base material has holding power to hold the solid particles higher than holding power of the fluid.

13. The forming method according to claim 1, wherein the causing the raised portion to hold the solid particles includes preparing the transfer plate and a raw material plate that holds the material to be transferred.

14. The forming method according to claim 13, wherein the causing the raised portion to hold the solid particles is performed by bringing the material to be transferred that is held by the raw material plate and the raised portion included in the transfer plate into contact with each other.

15. A transfer plate to transfer a linear pattern including a plurality of solid particles to a base material, the transfer plate comprising a raised portion that extends in a predetermined direction, wherein the raised portion has distribution of holding power to hold a material to be transferred in a width direction orthogonal to the predetermined direction in a manner that a region with higher holding power is interposed between regions with lower holding power, and has a portion with an elastic modulus that is lower than an elastic modulus of the solid particles.

* * * * *